Figure 1:
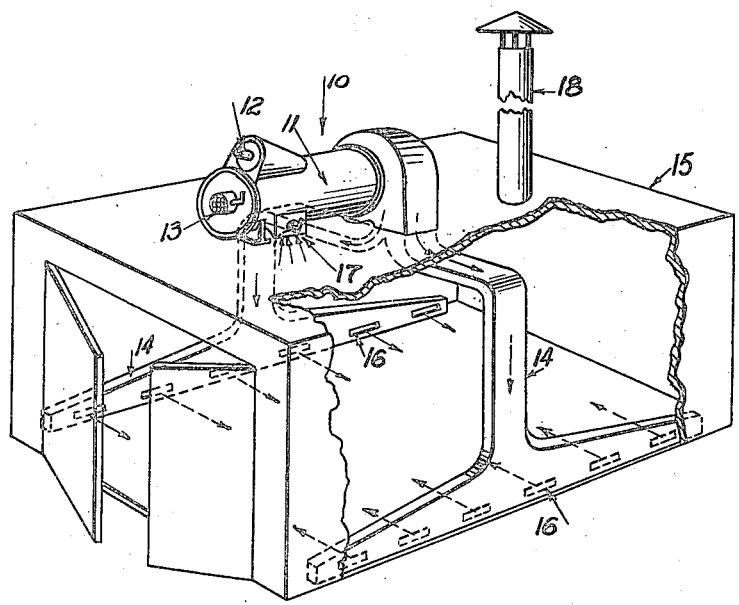

April 30, 1935.                J. R. MORRISON                1,999,513
                                 ROD BAKING
                              Filed Nov. 29, 1933

INVENTOR.
John R. Morrison
BY
Louis J. McBane
ATTORNEY.

Patented Apr. 30, 1935

1,999,513

UNITED STATES PATENT OFFICE 1,999,513

ROD BAKING

John R. Morrison, Cleveland, Ohio

Application November 29, 1933, Serial No. 700,331

5 Claims. (Cl. 34—24)

This invention relates to the art of rod baking. Rod baking is one of the steps in the process of making drawn wire. In that process, steel is hot rolled by passing through the mills, commonly used for that purpose, until it is in the form of rods suitable in size for cold drawing to make wire. It is well-known that the rod, as it comes from the mills, is not suitable for cold drawing, for it is covered with a scale which wears out the drawing dies rapidly and it forms a brittle wire likely to break easily. In order to prepare such rods, so that they may be drawn successfully, it is common first to pickle the rods in acid which removes the scale, then to dip the rods in a thin mixture of lime in water to neutralize the acid and to form a lime coating on the rods, then to bake the rods at 300° F., or more, for 1½ hours, or less, to drive off the occluded hydrogen caused by the pickling operation. The lime on the rods also serves as a dry lubricant for the dies during the drawing operation.

In baking the rods, the presence of the lime must be taken into consideration and an acid baking atmosphere avoided in order not to interfere with the elimination of the occluded hydrogen and so as not to react with the lime to form calcium carbonate. For this reason it has been common to heat such ovens electrically or indirectly, as by steam heating. Electrical heating is expensive. Steam heating is expensive and the temperature which may be maintained is barely high enough to be effective, it being impossible to hasten the process by using high temperatures.

The circulating type of heating system, where the oven atmosphere is heated by and mingled with the products of combustion, is desirable because of its efficiency and low cost. However, it has not been practical so to bake rods heretofore since, in the ordinary circulating oven, a damp acid oven atmosphere prevails which interferes with the hydrogen elimination and reacts with the lime, thus rendering the baking treatment ineffective. The ordinary circulating type of oven requires about twelve volumes of fresh air to each volume of gas, using gas as the example for fuel, for efficient combustion which results in a concentration of carbon dioxide of about thirteen percent in the oven atmosphere. This concentration may be reduced somewhat by using an excess of fresh air but that is limited by the necessity for maintaining a high intake temperature and by considerations of efficiency. It never has been practicable to use sufficient excess air to lower the carbon dioxide concentration sufficiently to make such heating useful for rod baking. Moreover, in the ordinary circulating type of heating system, in order to use sufficient heat to be commercially practicable, the temperature drop between the intake and outlet of the oven must be large. This results in condensation of moisture from the oven atmosphere, which moisture forms carbonic acid with the carbon dioxide, thus promoting the undesirable action on the rods and lime. In addition, the moisture rusts the rods thus rendering them unfit for drawing.

It is the object of this invention to provide a novel method of rod baking by virtue of which the efficiency of direct fired heating may be obtained at low cost while not subjecting the rods to undesirable oven atmosphere conditions. Other objects and advantages of the invention will become apparent in the following detailed description taken in connection with the accompanying drawing in which:

The figure is a perspective view, in outline, illustrating apparatus for practicing the method of this invention.

According to this invention, the recirculating type of heating system is used for rod baking.

As shown in the drawing, a heater 10, which may consist of a combustion chamber 11, of conventional construction, to which fuel, such as gas or oil, is fed through intake 12, and sufficient air supplied through inlet 13. The heat and products of combustion pass through ducts 14 and into the oven 15 through outlets 16. The heater and duct system may be arranged relative to the oven in any desired manner, it being desirable to introduce the heat and products of combustion over widely distributed portions of the oven. The oven atmosphere is returned to the combustion chamber through passage 17 where it is heated over again. A stack 18 is provided to exhaust a small percentage, usually about twenty percent, with considerable variation from that percentage permissible, to the atmosphere.

Since the oven atmosphere is recirculated continually, the temperature drop through the oven is kept small to maintain a uniform oven temperature, that condition being promoted by the rapid and continual circulation of the whole oven atmosphere. Since it is necessary only to supply sufficient heat to compensate for the small temperature drop, the volume of incoming air may be and is large relative to the volume of incoming fuel, gas for example. It has been found practicable, in practising this invention, to introduce fifty to sixty volumes of air for each volume of gas. Thus when the gas is burned, the concentration of carbon dioxide is reduced to a small percentage of the incoming gases. These gases when mixed with the oven atmosphere, which frequently is replenished with fresh air when opening the oven to put in and take out rods, which are placed in the oven in a conventional manner, which results in a gaseous mixture in which the concentration of carbon dioxide is negligible. The concentration of carbon dioxide in such an oven atmosphere may be as low as less than one percent and should not exceed approximately three percent.

The large excess of air in the oven atmosphere affords adequate protection against condensation of moisture for sufficient absorptive capacity for all the moisture present is afforded and the high and uniform temperature of the oven atmosphere maintains a condition of very low relative humidity. The oven atmosphere is very dry and, aided by the rapid and continual circulation of the oven atmosphere, acts to dry the rods, coming from the lime bath very quickly and thoroughly. Thus there is no opportunity for the formation of rust, the process of this invention being superior to those of the prior art in that respect.

Thus according to this invention, rods are baked in a directly heated oven atmosphere having carbon dioxide present in negligible quantities and being quite dry, a proper condition for rod baking.

While the invention has been described in detail, by way of illustration, it is not intended so to limit the invention inasmuch as variations in the details thereof may be made, as will be apparent to one skilled in the art, without departing from the spirit and scope of the invention as defined in the following claims.

What I claim as my invention is as follows:

1. The process of rod baking which consists in heating lime coated rods in an oven, recirculating the oven gases through a combustion chamber, introducing fresh air to the combustion chamber in volume sufficient to reduce the carbon dioxide concentration to a negligible percentage of the oven gases.

2. The process of rod baking which consists in heating lime coated rods in an oven, recirculating the oven gases through a combustion chamber at a rate to maintain a substantially uniform temperature throughout the oven, introducing fresh air into the combustion chamber in volume sufficient to reduce the carbon dioxide concentration to a negligible percentage of the oven atmosphere.

3. The process of rod baking which consists in heating lime coated rods in an oven, recirculating the oven gases through a combustion chamber at a rate to maintain a substantially uniform temperature throughout the oven, introducing fresh air into the combustion chamber in the ratio of forty or more volumes of air to each volume of gaseous fuel.

4. The process of rod baking which consists in heating lime coated rods in an oven, recirculating the oven gases through a combustion chamber at a rate to maintain a substantially uniform temperature throughout the oven, introducing fresh air into the combustion chamber in volume sufficient to reduce the concentration of carbon dioxide to approximately three percent or less of the oven atmosphere.

5. The process of rod baking which consists in heating lime coated rods in an oven, recirculating the oven gases through a combustion chamber at a rate to maintain a substantially uniform temperature throughout the oven, introducing fresh air into the combustion chamber in volume sufficient to maintain a dry oven atmosphere and a negligible concentration of carbon dioxide.

JOHN R. MORRISON.